3,406,286
PRECISELY TIMED A.C. SWITCHING SYSTEM
FOR X-RAY TUBES
William T. Bross, Cincinnati, Ohio, assignor to Liebel-Flarsheim Company, Division of Ritter Company, Inc., Rochester, N.Y., a corporation of Delaware
Filed Mar. 10, 1965, Ser. No. 438,650
9 Claims. (Cl. 250—95)

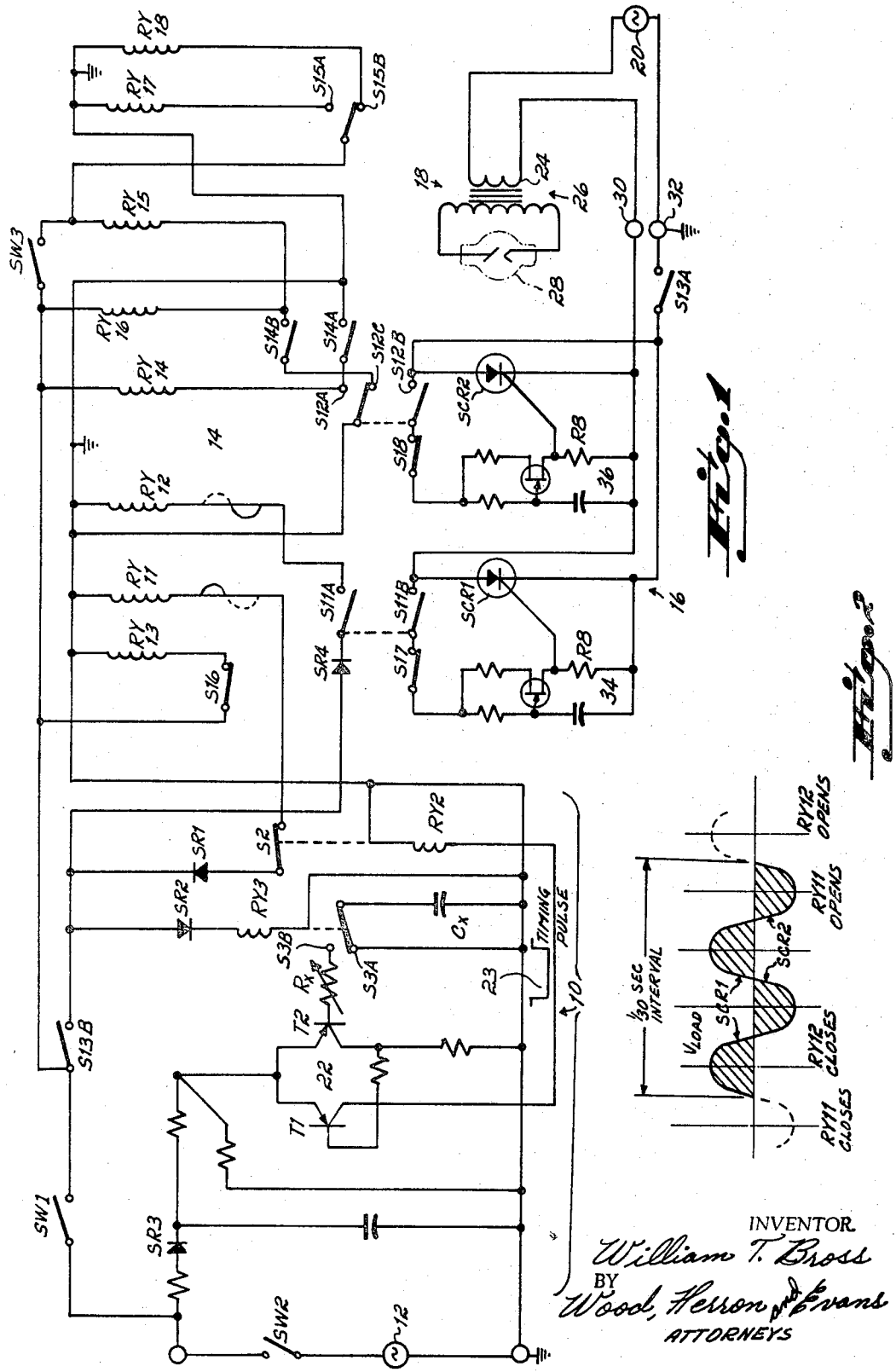

ABSTRACT OF THE DISCLOSURE

A switching circuit is disclosed for automatically initiating, without circuit adjustments for transformer reactance variation, supply of alternating current to a load at a particular point in the alternating current cycle and for a predetermined duration. The switching circuit includes a silicon controlled rectifier connected in series with a source of A.C. power and the load to be supplied, and a high frequency pulse source connected to the gate electrode of the silicon controlled rectiger for conditioning the rectifier for conduction. The high frequency pulse source, which triggers the rectifier to a conducting state at a point when the load current reaches the threshold level necessary to substain conduction, provides the switching circuit with automatic transformer reactance compensation. Specifically, the high frequency pulse source enables the silicon controlled rectifier to be reliably switched to a conducting state at approximately the zero current point regardless of changes in the degree of lag or lead of the load current, and to do so without the need for making adjustments in the triggering circuit for transformer reactance variations. For example, with a load of varying inductance, the high frequency pulse source enables the silicon controlled rectifier to be reliably driven into conduction at the approximate zero current point and the inductive load provided with power regardless of variations in inductance and, hence, current lag, and without circuit adjustments.

---

This invention relates broadly to A.C. switching circuits and more particularly to a precisely controlled electronic switching system for supplying A.C. to a load at a particular time of the A.C. cycle and for a predetermined duration.

This system is particularly applicable to loads which require high A.C. voltage and current such as X-ray apparatus. Exposure times in modern X-ray apparatus are in the order of half cycles or cycles of the normal 60-cycle A.C. supply. In other words, the exposure times are 1/120 of a second or 1/60 of a second or multiples thereof.

Timing devices for controlling the exposure time are known in the prior art. For example, there is disclosed in my U.S. Patent No. 2,963,596 an adjustable X-ray electronic timer which controls the operation of a power relay whose contacts are in the X-ray tube power supply circuit.

In such high voltage, high current apparatus, it is desirable to switch the A.C. power to the load when the alternating current is substantially at a zero value, thereby reducing dangerous transients and heavy surges of power which might cause damage to the X-ray tube or its associated step-up transformer.

Prior art systems utilizing power relay load switching are difficult to adjust to cause the A.C. to be applied to the load at a zero value of the A.C. In general, such a result was obtained by regulating the pull-in time of the power relay or other relays in the circuit or, in the case of reactive loads where the A.C. voltage and current are out of phase, by adding a phase shifting circuit. Of course, the step-up transformer of an X-ray tube presents a highly inductive load to the A.C. power supply and therefore the current in the transformer primary lags the voltage.

Therefore, the primary object of this invention is to provide a precisely controlled electronic A.C. load switching circuit which switches an A.C. source to a load at a current zero of the A.C. and applies the A.C. to the load for a predetermined interval.

Another object of this invention is to provide a precisely controlled A.C. load switching circuit employing current controlled, semi-conductor switching devices.

A further object of this invention is to provide a precision A.C. load switching circuit which is capable of selectively applying one cycle or one-half cycle of A.C. to a load.

Other objects and advantages of this invention will become apparent from the following written description and attached drawing which disclose in detail a preferred embodiment of this invention.

In the drawing:

FIGURE 1 is a schematic diagram of a preferred embodiment of a precisely timed A.C. load switching system; and FIGURE 2 is a timing diagram illustrating the operation of the circuit of FIGURE 1.

In FIGURE 1 the basic components of a complete precisely controlled A.C. load switching circuit are shown. An adjustable timer 10 controls the number of A.C. cycles applied from an A.C. power source 12 to a relay control circuit 14 which in turn controls the operation of an electronic semiconductor load switching circuit 16. A load 18 is connected through the switching circuit 16 to an A.C. power source 20 which is the same as source 12. Switching circuit 16 cooperates with timer 10 and relay control circuit 14 to apply A.C. power to load 18 at a substantially zero value of the alternating current for a period of the time determined by timer 10.

Let us now look at the FIGURE 1 system in more detail. Timer 10 itself forms no part of the present invention and may be of the type disclosed in U.S. Patent No. 2,963,596. However, a brief operation of timer 10 will be presented in order to provide a better understanding of the operation of relay circuits 14 and electronic switching circuit 16.

Timer 10 is conditioned for operation by manually closing a switch SW2 to provide D.C. through a diode SR3 to apply an operating potential to a monostable multivibrator 22 comprising transistors T1 and T2. Multivibrator 22 is thereby placed in its stable condition wherein transistor T1 is heavily conducting and transistor T2 is turned off. Consequently, relay RY2 is energized to open its normally closed contacts S2. A variable resistor $R_x$ in the timing circuit $R_xC_x$ of multivibrator 22 may be adjusted to determine the time constant of the circuit and thereby the interval during which A.C. power is applied to load 18. In the preferred embodiment, load 18 is the primary winding 24 of a step-up transformer 26 which drives an X-ray tube 28. In other words, the interval during which A.C. power is applied to load 18 is the exposure time of the X-ray apparatus.

This exposure interval is initiated by closing a switch SW1 (which may be hand-held by the operator) to apply A.C. through normally closed relay contacts S16 and the coil of a relay RY13 whose two sets of normally open switch contacts S13A and S13B are thereby closed. S13A are the main power contacts connected in series between the load terminals 30, 32 and A.C. source 20. S13B are connected between switch SW1 and timer 10 to initiate a timing cycle of the timer.

When switch contacts S13B close, D.C. current is supplied through diode SR2 on the next positive half cycle of A.C. to energize the relay RY3 which operates to open its normally closed contact S3A and close its normally open contact S3B. Consequently, timing capacitor $C_x$ is connected to the base circuit of transistor T2 so that multivibrator 22 can now switch. Since capacitor $C_x$ is in a completely discharged state at this time, multivibrator 22 immediately switches from its stable to its unstable state in which transistor T1 is cut off and transistor T2 is conducting. Since T1 is now non-conducting, RY2 is de-energized to permit contacts S2 to return to their normally closed position. The timing interval of timer 10 is determined by the time required to charge capacitor $C_x$ to such a value that T2 cuts off again to render T1 conducting, thereby returning multivibrator 22 to its steady state and energizing relay RY2 to open switch contacts S2. The timing interval is determined by the duration of the negative timing pulse 23 whose width corresponds to the cut-off time of transistor T2.

When switch contacts S2 close upon the initiation of the timing cycle or X-ray exposure interval, a circuit is completed from A.C. source 12 through switch SW1, switch contacts S13B and diode SR1 to relay RY11 to permit negative half cycles of A.C. to flow through the coil of RY11. Relay RY11 operates to close its switch contacts about one-quarter of a cycle after power is applied to the relay coil. Furthermore, the switch contacts remain closed for more than a half cycle after the relay coil is de-energized, thereby eliminating contact flutter. Because of the very accurate synchronous operation of timer 10 along with the polarizing effect of diode SR1, relay RY11 will always close very nearly at the phase angle indicated in the timing diagram of FIGURE 2.

When RY11 is energized, its first set of switch contacts S11A close to complete a circuit from A.C. source 12 through diode SR4 and the coil of a relay RY12. Because of the diode SR4, RY12 is energized on positive half cycles of the A.C. to close its normally open upper contact S12A. Relay RY12 has the same operating characteristics as RY11 and consequently closes at approximately the same point in the next half cycle of the A.C. as clearly shown in FIGURE 2.

When contact S12A is closed, a circuit is completed through the coil of relay RY14 to close both sets of its normally open switch contacts S14A and S14B. Closed contact S14A completes a holding circuit through the coil of relay RY14 until the holding circuit is broken by the opening of switch SW1 at the end of the exposure time. Closed contact S14B connects the lower end of the coil of a relay RY16 to the normally closed lower contact S12C of RY12. As previously stated, switch contacts S16 are normally closed; consequently, when relay RY12 is energized, the circuit through the coil of RY16 is opened and switch contacts S16 are closed. As will be explained later, at the end of the exposure time, relay RY12 drops out to close S12C and energize RY16 to open contacts S16.

As will be recalled, timer 10 operates in conjunction with diodes SR1 and SR4 to apply a predetermined number of alternate half cycles of A.C. voltage to relays RY11 and RY12, respectively. When relay RY11 is energized, contacts S11B close to complete a circuit from A.C. source 20 through the transformer primary winding 24, load terminal 30, and normally closed relay contacts S17 to a unijunction transistor firing circuit 34 which applies firing pulses to the gate electrode of a silicon controlled rectifier SCR1. In a similar manner, closed switch contacts S12B energize a second unijunction transistor firing circuit 36 which applies firing pulses to the gate electrode of a second silicon controlled rectifier SCR2. SCR1 is poled to conduct on positive half cycles of current from source 20 and SCR2 on negative half cycles.

Firing circuits 34 and 36 are conventional unijunction transistor relaxation oscillators which are designed to operate at a frequency in excess of 1000 cycles per second. When relay switch contacts S11B and S12B are closed sequentially, these firing circuits oscillate to produce voltage spikes across their respective output resistors R8.

Since the two firing and switching circuits are otherwise identical, we will discuss the operation of only SCR1 and its firing circuit 34.

The timing diagram of FIGURE 2 shows that relay RY11 closes before the voltage across SCR1 is of the proper polarity to permit SCR1 to conduct. As soon as the polarity of the voltage across SCR1 reverses or becomes positive, SCR1 begins receiving firing pulses since firing circuit 34 has become energized. However, since SCR1 is a current actuated device, it cannot actually turn on to become conducting until both current and voltage are of proper polarity, and current can flow through it. That is, the anode of SCR1 must be positive with respect to its cathode before it will turn on even though firing pulses are being applied to its gate electrode. When the load being switched is resistive, the current and voltage are in phase (as shown in FIGURE 2) so that SCR1 will be turned on by the first gate pulse it receives after the load voltage across it reaches the minimum positive value, usually only a few volts, to produce a sustaining current through the SCR.

However, when the load circuit is inductive, as is the case when the load is a transformer, SCR1 will not fire at once but must wait until the lagging load current becomes positive to permit complete turn-on of the SCR. In other words, the firing pulses from the firing circuit 34 will not be effective to turn on SCR1 until the load current lag time has expired and the current has reached the minimal value necessary to sustain conduction. In this manner, load switching circuit 16 automatically adjusts itself to the proper firing angle through the particular load connected across load terminals 30, 32. The operation of SCR2 is similar excepting, of course, that its operation is displaced in time one half cycle from the firing of SCR1.

It is necessary to start the exposure at the natural lag angle, i.e. zero current, of transformer 26 in order to maintain uniform energy distribution in the secondary impulses immediately following turn-on. The shaded area of the timing diagram of FIGURE 2 clearly shows the relationship between the operation of relays RY11 and RY12 and the firing of SCR1 and SCR2. The shaded portions of the wave form indicate which SCR is conducting at a particular time.

When the monostable multivibrator 22 of timer 10 times out or returns to its steady state, relay RY2 is energized to open its switch contacts S2, thereby de-energizing relay RY11 to open contacts S11A and open the circuit through the coil of relay RY12. Consequently, switch contacts S11B and S12B also open to open the firing circuits of the SCR1 and SCR2, respectively.

During the timing cycle, while switch SW1 is closed, relay RY14 is maintained energized by the holding circuit completed through its switch contacts S14A, and switch contacts S14B are also held closed. However, when relay RY12 is de-energized at the end of an exposure, its upper contact S12A is opened and its normally closed lower contact S12C is closed. A circuit is then completed from source 12 through the coil of RY16 which then opens its normally closed switch contacts S16 to break the circuit through the coil of power relay RY13. Consequently, main power contacts S13A are opened to interrupt the main power circuit through the primary winding 24 of transformer 26. In addition, contacts S13B of RY13 are opened to de-energize RY3 so that contact S3B is opened and contact S3A is closed to discharge capacitor $C_x$, thereby resetting timer 10 in preparation for another exposure cycle. Exposure switch SW1 must be opened before another exposure can be made.

The foregoing description describes the operation of the preferred switching system for all time intervals of 1/60 of a second, i.e., one A.C. cycle, or multiples thereof. The timing diagram of FIGURE 2 shows a time interval of 1/30 of a second or two A.C. cycles.

However, it is often desirable in modern high powered X-ray apparatus to have available an exposure time of 1/120 of a second or a half cycle. Because of the predetermined time sequence relationship between relays RY11 and RY12, the system as previously described is unable to make exposures of any uneven number of electrical impulses unless one of the firing circuits 34, 36 is disabled.

Consequently, additional circuitry is shown in FIGURE 1 for disabling one of the firing circuits in order to permit exposure times of one-half cycle. A switch SW3 on the X-ray apparatus is closed when the timer is set for an exposure of 1/120 second, and permits relays RY15, RY17, and RY18 to operate during the switching cycle. RY15 is a specialized, but conventional, latching type of single pole, double throw relay which transfers its contacts S15A and S15B and latches each time it is pulsed.

When a single impulse or half cycle exposure of 1/120 of a second is made, all relays operate as previously described except that either relay RY17 or RY18 will also be energized depending upon which of the contacts S15A, S15B of relay RY15 is closed. Relay switch contacts S17 and S18 are normally closed and are located in the SCR firing circuits 34 and 36, respectively. For example, when the coil of relay RY17 is energized, its contacts S17 will open to disable the firing circuit 34 of SCR1. Which of the contacts S17 and S18 will open is determined by the position in which RY15 was last latched, which position in turn determines which of the relays RY17, RY18 is energized. Relays RY17 and RY18 prevent either SCR1 or SCR2 from conducting. Timer 10 still supplies a full cycle of A.C. to RY11 and RY12, but only one-half the cycle is utilized by the load switching circuit 16.

Each time an exposure terminates and RY16 is energized through switch contacts S14B and S12C, relay RY15 is also energized to transfer its contacts. This arrangement permits primary winding 24 to be supplied with single impulses of opposite polarity on each successive exposure to prevent cumulative magnetization in transformer 26. It will be noted that S13A will open whenever switch SW1 is opened, interrupting the load circuit, which is a safety factor in the event one of the SCR's fails.

This load switching system is capable of turning on or off an A.C. supply to a resistive or reactive load by means of a control signal produced by a timer. Consequently, a very low power control signal effects a complete turn-on or turn-off of a much higher current supply. Typically, the ratio of load current being switched to control signal current would be greater than 10,000 to 1.

While there have been shown and described and pointed out the fundamental novel features of the invention as applied to the preferred embodiment, it will be understood that various omissions and substitutions and changes in the form and details of the system illustrated and in its operation may be made by those skilled in the art without departing from the spirit of the invention. It is the intension, therefore, to be limited only as indicated by the scope of the following claims.

What is claimed is:

1. An A.C. system comprising:
   (a) an X-ray tube;
   (b) a transformer having a secondary winding connected to energize said X-ray tube, and a primary winding;
   (c) an electronic switching circuit having at least one normally non-conducting controlled rectifier poled in a first direction connected between said transformer primary and a source of A.C. power;
   (d) a first high frequency pulse firing circuit for applying firing pulses to said controlled rectifier, said firing pulses having a frequency such that over a range of transformer reactance at least one of said firing pulses is applied when the current of the transformer reaches the minimal value necessary to sustain conduction thereby automatically providing transformer reactance compensation; and
   (e) timer means for controlling the application of a predetermined number of cycles of A.C. voltage to said switching circuit and said first firing circuit, whereby said controlled rectifier is conditioned for conduction by firing pulses generated by said first firing circuit on alternate half cycles of A.C. voltage to pass current half cycles of only one polarity from said source through said transformer.

2. An A.C. system as defined in claim 1 further comprising:
   (a) means connecting said timer means to said A.C. source, said timer being operative to produce a control signal corresponding to said predetermined time interval, and
   (b) a relay control circuit connected between said timer means and said switching circuit and being responsive to said control signal to connect said first firing circuit to said A.C. source for said predetermined number of cycles of A.C. voltage.

3. An A.C. system as defined in claim 2
   (a) wherein said electronic switching circuit also includes a second normally non-conducting controlled rectifier poled in the direction opposite to said one controlled rectifier and connected between said primary and said A.C. source, and further comprising
   (b) a second firing circuit for applying pulses to said second controlled rectifier, whereby said second controlled rectifier is conditioned by firing pulses generated by said second firing circuit on alternate half cycles of the A.C. voltage to pass half cycles of current of only the opposite polarity from said source through said primary.

4. An A.C. system as defined in claim 3 further comprising selectively operable switch means responsive to successive operations of said switching system alternately to disable said first and second controlled rectifiers so that alternate one-half cycles of current are passed through said primary for each cycle of A.C. voltage upon successive operations of said system.

5. An A.C. system as defined in claim 3 further comprising:
   (a) a first control relay having normally open contacts in said first firing circuit,
   (b) a second control relay having normally open contacts in said second firing circuit, and
   (c) diode means responsive to said control pulse alternately to apply successive half cycles of said predetermined number of A.C. voltage cycles to said first and second relays, thereby sequentially closing said first and second contacts on successive half cycles alternately to fire said first and second controlled rectifiers so that current passes through said primary continuously during said predetermined number of A.C. cycles.

6. An X-ray circuit comprising:
   (a) an X-ray tube;
   (b) a transformer having a secondary winding connected to energize said X-ray tube, and a primary winding;
   (c) an electronic switching circuit comprising:
      (1) a pair of oppositely poled parallel connected silicon controlled rectifiers connected in series with a source of A.C. power and said primary, each rectifier having a gate electrode,
      (2) a uni-junction transistor oscillator connected to the gate electrode of each silicon controlled rectifier, for supplying a continuous stream of firing pulses thereto, said firing pulses having a frequency such that over a range of transformer reactance at least one of said firing pulses is applied when the current of the transformer reaches the minimal value necessary to sustain conduction thereby automatically providing transformer reactance compensation,
(d) a relay control circuit comprising:
   (1) a first relay with a normally open switch connecting one of the oscillators to said A.C. source, and
   (2) a second relay with a normally open switch connecting the other oscillator to said A.C. source,
(e) an adjustable electronic timer operative to produce a control pulse corresponding to a desired exposure time interval, measured in complete cycles of A.C., of said X-ray tube energized through said transformer, and
(f) means responsive to said control pulse to apply the half cycles of positive voltage to said first relay and the half cycles of negative voltage to said second relay, said first and second relays being responsive to their respective half cycles of voltage sequentially to close said normally open switches on alternate half cycles of said A.C., whereby said oscillators are sequentially energized from said A.C. source to condition their respectively associated silicon controlled rectifiers to pass alternate half cycles of current from said source through said transformer primary during said exposure time interval.

7. An X-ray circuit comprising:
(a) an X-ray tube,
(b) a transformer having a secondary winding connected to energize said X-ray tube, and a primary winding,
(c) an electronic switching circuit connected between said primary of said transformer and a source of A.C. power and comprising
   (1) a pair of oppositely poled silicon controlled rectifiers each connected in series with said source and said primary, said rectifiers being connected in parallel with each other, and
   (2) firing circuit means operatively connected to each controlled rectifier for applying firing pulses thereto during one half of the cycle of said A.C., said firing pulses having a frequency such that over a range of transformer reactance at least one of said firing pulses is applied when the current of the transformer reaches the minimal value necessary to sustain conduction thereby automatically providing transformer reactance compensation,
(d) a relay control circuit comprising:
   (1) a first relay with a normally open switch connecting one of the firing circuit means to said A.C. source, and
   (2) a second relay with a normally open switch connecting the other firing circuit means to said A.C. source,
(e) an adjustable electronic timer operative to produce a control pulse of one A.C. cycle in duration,
(f) means responsive to said control pulse to apply the half cycle of positive voltage to said first relay and half cycle of negative voltage to said second relay, said first and second relays being responsive to their respective half cycles of voltage sequentially to close said normally open switches on alternate half cycles of said A.C.,
(g) switch means for selectively disabling either of said firing circuits, thereby permitting only one-half cycle of A.C. to be applied to said primary,
(h) and means operative upon successive exposures of one-half cycle to disable said firing circuits alternately.

8. The circuit of claim 7 wherein said means operative upon successive exposures comprises double throw switch means thrown oppositely in response to each said control pulse and two relays alternately operated through said double throw switch means, said relays having normally closed switches connected in the respective firing circuits.

9. An X-ray apparatus switching circuit for precisely controlling the switching of an X-ray transformer to a source of A.C. power for a predetermined number of A.C. cycles comprising:
(a) an electronic switching circuit connected between an X-ray transformer primary and a source of A.C. power and comprising:
   (1) a pair of oppositely poled parallel connected silicon controlled rectifiers connected in series with said source and said primary, each rectifier having a gate electrode,
   (2) a unijunction transistor oscillator connected to the gate electrode of each silicon controlled rectifier, and when energized supplying firing voltage spikes to said gate electrode at a frequency in excess of about 1000 c.p.s.,
(b) a relay control circuit comprising:
   (1) a first relay with a normally open switch connecting one of the oscillators to said A.C. source, and
   (2) a second relay with a normally open switch connecting the other oscillator to said A.C. source,
(c) an adjustable electronic timer operative to produce a control pulse corresponding to a desired exposure time interval measured in complete cycles of A.C., of X-ray apparatus energized through said transformer, and
(d) means responsive to said control pulse for the duration thereof to apply half cycles of positive voltage to said first relay and negative half cycles of voltage to said second relay, said first and second relays being responsive to their respective half cycles of voltage sequentially to close said normally open switches on alternate half cycles of said A.C., thereby sequentially energizing said oscillators from said A.C. source to apply firing voltage spikes to the respective gate electrodes,
   the controlled rectifier associated with each firing circuit beginning to conduct current only when conditioned by a firing pulse from said firing circuit and when current in said primary becomes of the same polarity as the voltage thereacross, whereby current is switched to said apparatus only when said current is substantially at a zero amplitude.

References Cited

UNITED STATES PATENTS

| | | | |
|---|---|---|---|
| 2,584,007 | 1/1952 | Fischer | 323—18 |
| 2,752,509 | 6/1956 | Zavales | 250—95 |
| 2,963,596 | 12/1960 | Bross | 307—88.5 X |
| 3,192,466 | 6/1965 | Sylvan et al. | 323—22 |

WILLIAM F. LINDQUIST, *Primary Examiner.*